United States Patent [19]
Tartabini et al.

[11] 3,902,528
[45] Sept. 2, 1975

[54] PNEUMATIC PLUG FOR HYDRAULIC CONDUITS

[75] Inventors: Joseph J. Tartabini, Independence; Frank L. Sirk, South Euclid, both of Ohio

[73] Assignee: United Survey, Inc., Cleveland, Ohio

[22] Filed: June 22, 1973

[21] Appl. No.: 372,587

[52] U.S. Cl. .................................. 138/90; 138/93
[51] Int. Cl.[2] .................. F16L 55/10; F16L 55/12
[58] Field of Search ............. 138/89.1, 89.2, 90, 93, 138/91

[56] References Cited
UNITED STATES PATENTS

| | | | |
|---|---|---|---|
| 1,221,733 | 4/1917 | Henderson | 138/93 |
| 2,279,257 | 4/1942 | Svirsky | 138/90 |
| 2,299,116 | 10/1942 | Svirsky | 138/90 |
| 3,292,254 | 12/1966 | Sloan | 138/90 |
| 3,618,639 | 11/1971 | Daley et al. | 138/93 |

Primary Examiner—James J. Gill
Assistant Examiner—Anthony V. Ciarlante
Attorney, Agent, or Firm—P. D. Golrick

[57] ABSTRACT

A tubular metal mandrel and a longitudinally coextensive external elastomeric sleeve locally circumferentially bonded thereto at the opposite ends constitute a low cost inflatable element, on which like recessed end caps are secured by screwing onto an end-threaded, coaxially centered core pipe; or by three tie rods and external end nuts; the axial forces whereof effect a seal between male and female bevels respectively on the sleeve ends and in the caps; so that the mandrel interior may be air-pressurized through one cap thereby to inflate the sleeve via air ports through the mandrel wall, thus providing a pneumatic plug device. With distinct types of end cap pairs, the device is convertible to provide a sewer plug, or a single air test or dual air test plug. A valving arrangement for applying test air pressure from an inflating air system further contributes to speedy and accurate testing.

5 Claims, 8 Drawing Figures

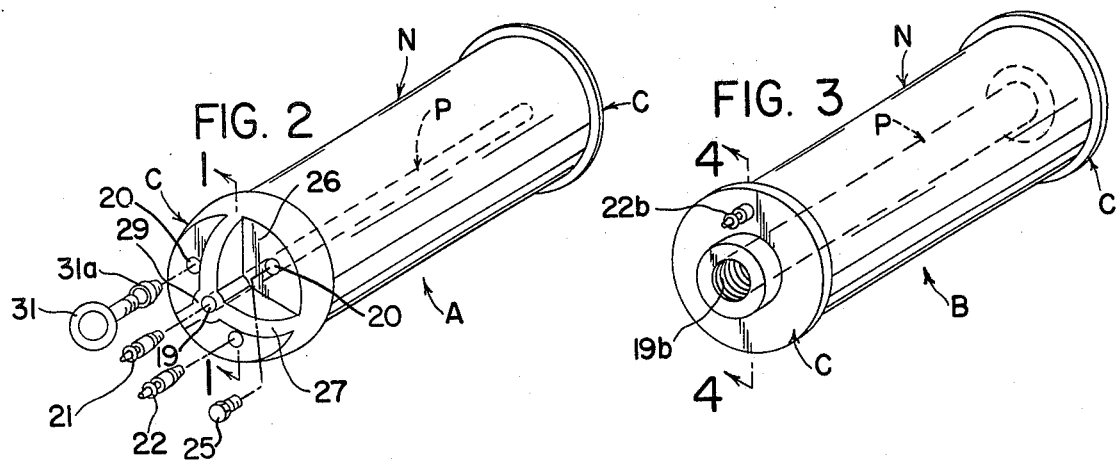
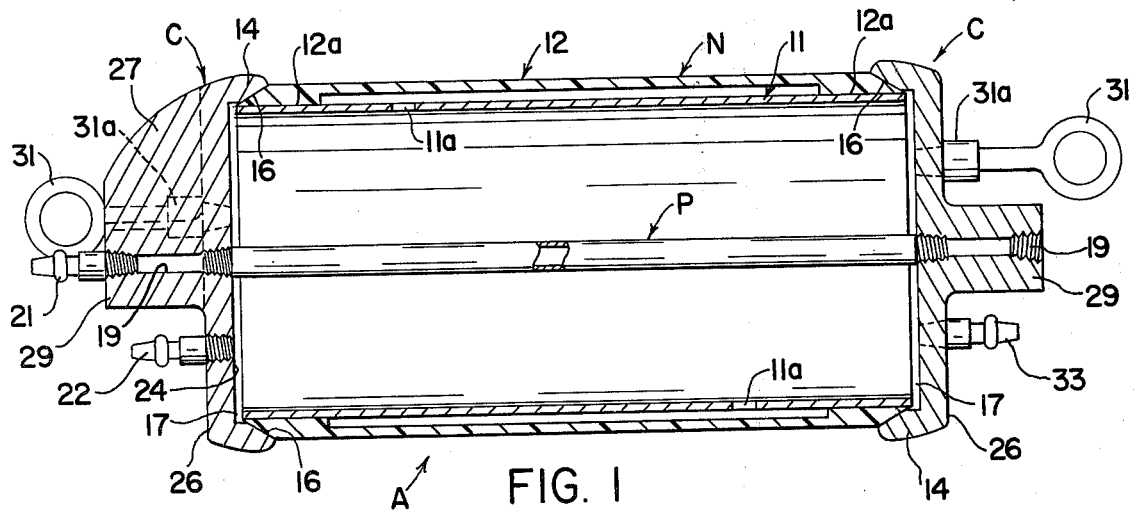
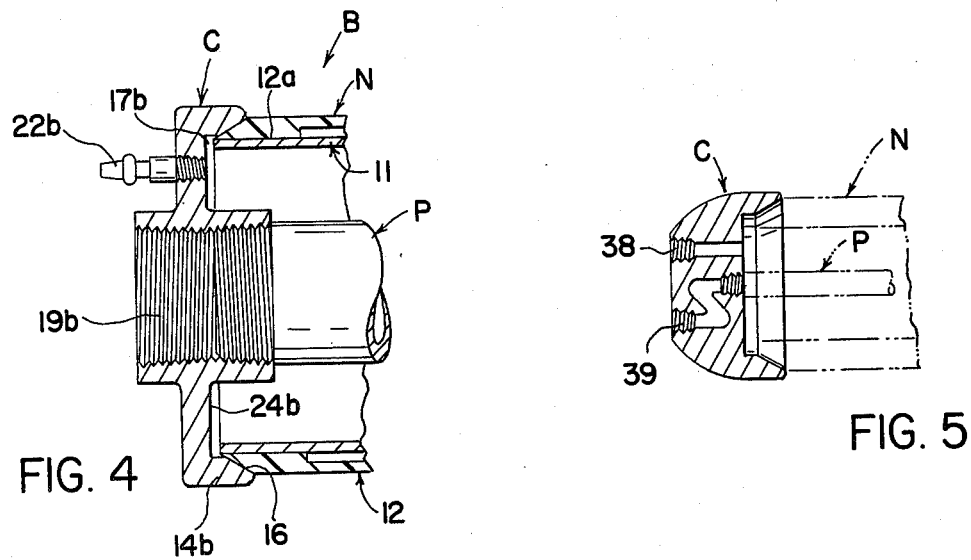

PNEUMATIC PLUG FOR HYDRAULIC CONDUITS

Mechanically-expandible, and fluid-inflatable, especially air-inflatable, devices have been long known and used to plug conduits in which inserted for various purposes. Thus simple plugs have been used in the closet connection branches of fittings in soil lines put under static water head for leak testing; or for soil or other drain lines, another type of inflatable plug, having a water pipe therethrough, has been inserted to block the line against back flow of flushing water delivered by hose to and through the plug to clear out a downstream obstruction.

Also in testing for or locating leaks in sewer or drain lines, or gas mains, air inflated plugs have found extensive application. For example, in a simple air test, where the main or line is closed in the test direction beyond a point of plug insertion, a plug may be used served by one air hose for inflation, and by a second hose for the test air pressure separately from the inflation air conducted through the plug to establish an initial pressurized air volume, with the absence, or presence and extent of a leak being determined by observing a pressure gauge on the test air supply system exterior of the main under test. However the precise location of a leak generally is not readily established with the single plug.

Hence, dual air test plug arrangements are used with two inflatable plugs mechanically connected to each other at a fixed spacing as part of a distance-marked or measured cable drawn incrementally from an insertion point, through the main or line section being checked, to an available opening at another point. The plugs, also pneumatically connected, simultaneously are deflated before, and inflated after each incremental advance, to seal off a main or line interval therebetween, which is then tested by observing the pressure behaviour at the interval again by means of a hose connection through one plug independently of the inflating air; the observed pressure provided, in the case of a gas main under pressure, by the volume of gas trapped between the plugs; or in other cases, by air supplied as in the previously described simple single air test plug arrangement.

It is with test plugs and arrangements of the aforegoing inflatable type that the present invention is particularly concerned, and with overcoming problems of the prior art related thereto, which has proposed a great variety of inflatable plug structures and systems for using the same.

Inflatable plugs of the prior art, especially those intended to be drawn through drain or sewerage lines, have been burdened with many and diverse disadvantages, for example, in one or more of structural complexity, or high initial manufactuing cost, or relatively short service life, or cost of repair, and others. Particularly in the case of plugs in popular current use for that type of service, the inflatable elastomeric component represents a comparatively complex shape, entailing expensive mold tooling and molding operations, even where not molded onto other parts; and this component moreover, is subject to heavy wear and frequent damage. If repair is necessary, and indeed possible, the entire plug usually must be returned to the manufacturer; or where return be not required, the repair is rather time-consuming even though a spare elastic component is at hand.

Further in dual air test plug arrangements, where high pressure air is supplied through one hose to inflate the two plugs and then through a second hose the test air pressure is delivered to the conduit interval after the inflation operation, particularly when the operating hose lengths are some hundreds of feet, considerable skill is required to be certain that the plugs are correctly inflated; and then to be sure that the test air in the system is truly stabilized for significant pressure observations. A period of some minutes may be required for even the latter phase of operations.

By the present invention, the inflatable component is a simple cylindrical composite, of a plain tubular mandrel, preferably aluminum, with a surrounding longitudinally coextensive elastomeric sleeve circumferentially sealed or bonded thereto near each end to define between the bonded ends an annularly cylindrical air space, pressurizable for inflation through merely one or two simple drilled apertures through the mandrel tube wall. The sleeve is made by known mandrel wrapping operations wherein the wrapped elastomeric sheet material is bonded to itself and locally at the ends, to the mandrel, with appropriate cement. The sleeve ends are male-beveled precisely by machining, so that end caps, recessed and complementarily female-beveled and held thereon by a coaxially centered core pipe or by tie rods equi-spaced about the axis, effect an air-tight seal. This structure is in effect "self-gasketing".

To complete the inflation air pathway nothing further is needed than an air hose fitting, preferably a quick-connect-disconnect type, threaded in an aperture through the cap to communicate with the mandrel interior. The central threaded formation in each cap for the core pipe represents a through bore or passage externally threaded for a hose connection or hose connecting fitting, so that a fluid passageway is thereby also provided through the plug structure quite independently of the inflation air passage. It is thus obvious that the essential structure of the plug is simple in form and fabrication; and accordingly enables low cost manufacture in a rugged form.

Moreover, for a given inflatable element or component, two cap pairs of different forms may be furnished along with a respectively corresponding core pipe, offering by a simply-effected conversion a sewer plug with one cap form, or an air test plug with the other cap form. The cap elements as such in a pair are identical, preferably of cast aluminum alloy, with a minimum of machining required, merely for the female bevel and the tapping of holes provided for an inflation air fitting, the core pipe, water hose or test air fittings, and additionally for draw cable-attaching eye bolts or the like in the air test plugs.

The air test plugs, being identical, each have the maximum number of threaded apertures required for a cap with two air inlet fittings; and in other cases, the unneeded holes are merely plugged. Thus advantageously either a single air test plug, or either of the plugs for a dual air test plug arrangement, may be assembled from a pair of plugs of the same type. Thus both for the manufacturer by minimizing the number of distinct parts, and for the user for the further reason of flexibility of application, the new structure is decidedly advantageous. The described structure is suitable for use in quite differently sized plugs, though of course with different components as dictated by size.

Moreover, with the air test plug configurations offered by this invention, a further component is readily incorporated, namely a relief valve in a cap aperture facing the test interval between the two plugs of a dual air test plug arrangement, which additional component reduces time and conduces to more accurate testing. Such a relief valve is set to release to the interval air supplied to the mandrel interior for inflation purposes when the proper inflation pressure is reached; thus immediately pressurizing the test area from what is in effect a local source, without the usual delay of feeding low pressure test air through the test line hose until stabilization is reached. Both assurance of proper inflation and elimination of the delay in pressurization of the test interval or conduit section are automatically achieved.

It is the general object of the present invention to provide a simple economically manufactured fluid inflatable plug for hydraulic or similar lines.

Another object is to provide a structure for an inflatable plug of the character described which permits ready conversion between a sewer plug configuration and an air test plug configuration, and indeed of either of the two specific forms required in a dual air test plug arrangement; while utilizing a single inflatable component.

A still further object is to provide a pneumatically inflatable plug for cylindrical conduits, which is readily assembled or disassembled for repair or other purposes.

A still further object is the provision of a dual air test plug arrangement and plug which eliminates particular operating uncertainties and delays.

Other objects and advantages will appear from the following description and the drawings, wherein:

FIG. 1 is a longitudinal section of an inflatable plug incorporating the invention, and having an air test plug configuration; the section being taken as indicated by the line 1—1 in FIG. 2;

FIG. 2 is an isometric view corresponding to the arrangement of FIG. 1;

FIG. 3 is an isometric view showing the device of FIGS. 1–2 converted to a sewer plug configuration;

FIG. 4 is a fragmentary longitudinal section taken at 4—4 in FIG. 3;

FIG. 5 is a fragmentary longitudinal section of an end cap for a smaller size single air test plug;

Figure 6:
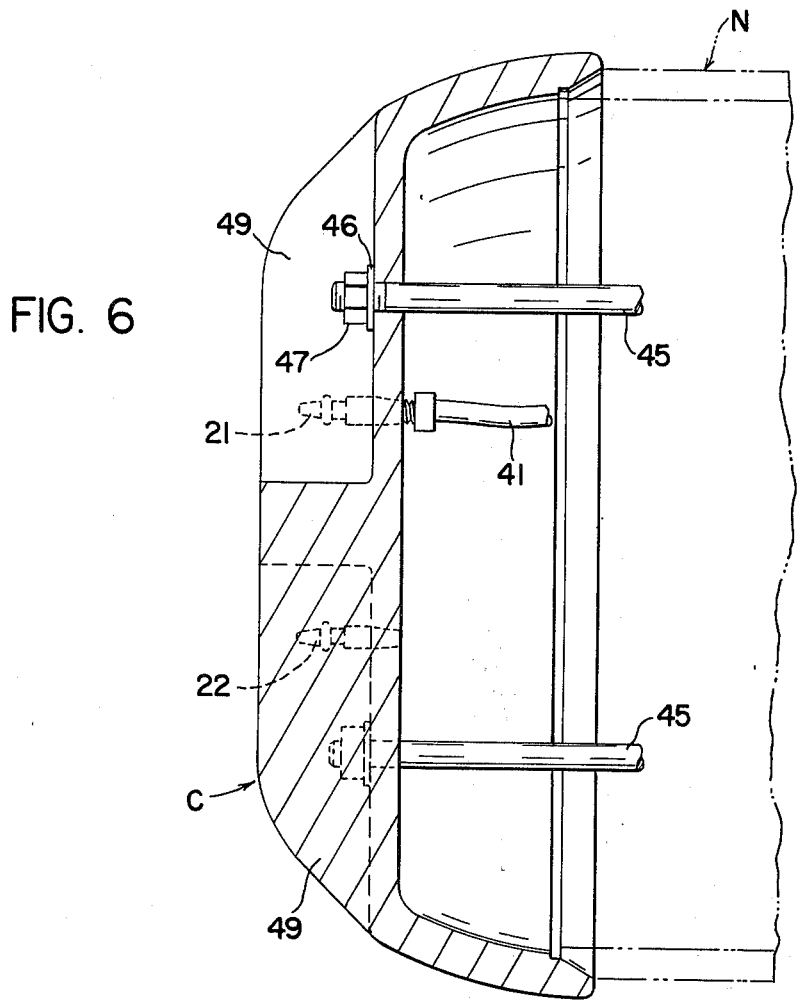
FIG. 6 is a fragmentary longitudinal section of an end cap of a larger size single air test plug, using tie rods to secure the assembly.

In the drawings, the principal characterizing structure is best seen in the device A in FIG. 1 which, with FIG. 2, happens to represent a pneumatically inflatable air test plug configuration; FIGS. 3 and 4, on the other hand, represent in the device B a pneumatically inflatable sewer plug configuration; these two configurations being readily convertible into one another as hereinafter explained.

Both devices A and B include as principal parts an inflatable component N constituted of a rigid tubular mandrel 11, and thereabout a longitudinally coextensive, expandible elastomeric sleeve 12 with ends only circumferentially bonded at 12a, 12a and thereby sealed to the mandrel ends; end closures C here termed caps C secured to respective ends of the component N, and circumferentially sealing to the ends thereof by engagement with the sleeve ends of circumferential cap flange portions 14, defining respective face recesses; and means, securing the caps on the ends of inflatable component N and developing longitudinally directed forces maintaining the sealing engagement.

The bonding regions 12a preferably also afford a slight spacing from the mandrel of the unbonded intervening part of the sleeve length, as is readily attained by local build up in the mandrel wrapping type fabrication. In the unpressurized device this results beneficially in an annularly cylindrical narrow air space, here at times called an "inflation space", between the free sleeve portion and the underlying mandrel, to which air ports 11a are drilled in the mandrel blank at points just in from each end and rotationally spaced 180°. These ports provide inflating access to air from the mandrel hollow into which it is supplied under pressure.

Though the caps are of somewhat different and simpler form in device B, it has in common with device A similar structures for obtaining the seal and the cap securement; and according in FIGS. 3 and 4 reference numerals are used similar to those used in FIGS. 1 and 2, for analogous parts, but carrying a suffix *b*; and description of the common structure is not repeated for FIGS. 3–4. In each device, however, the two cap elements C are identical for interchangeability of and reduction in the number of primary elements.

As more clearly seen in FIG. 1, the ends of the sleeve are male-beveled (e.g., at 30° to the axis) down to the square cut end faces or edges of the mandrel; the recess-defining flange 14 of each cap is correspondingly female-beveled at bevel 16. The latter bevel terminates in a shallow cylindrical recess surface 17, slightly larger in diameter than the outside diameter of the mandrel, so that the corresponding capped end of the latter has radial clearance which, conjoined with an end clearance, ensures that as the caps are drawn onto the ends, there is no interference and the desired seal is attained at the mating female and male bevels.

In both devices, each cap has a central hole or bore 19 preferably taper-threaded from both ends, but possibly straight threaded throughout where appropriate sealing composition is used; so that screwing the caps onto the corresponding threaded ends of a central core pipe P, draws them onto the ends of element N with the appropriate sealing. The outer end of one cap bore 19 then may receive a threaded quick connect-disconnect male air hose fitting 21 or the like, with the bore 19 of the other cap left open, as in FIG. 2, offering a fluid air passage through the device A independent of the inflating air path which is provided by another similar fitting 22 threaded into an eccentrically or off-axis-located threaded aperture opening 20 through the cap end wall 24 into the mandrel hollow, and through parts 11a to the described inflation space.

Figure 8:
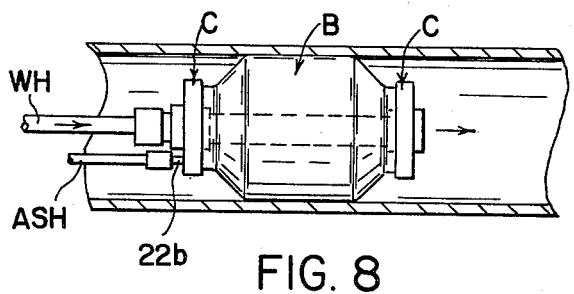
FIG. 8 is a representation similar to FIG. 7 but for a sewer plug configuration.

In the device B, the sewer plug configuration, in the closures or caps C only one eccentric threaded hole is required for the inflation air connection fitting 22b at one end, the corresponding hole being plugged at the other. The size of core pipe P is comparatively large to carry flushing water fed through the device by a hose WH (see FIG. 8) connected by an appropriate fitting or coupling threaded into the outer end of bore 19b, the bore 19b in the opposite end cap being of course left open; or both ends may be closed by pipe plugs where it is desired to use device B as a simple air inflated plug. Thus the cap form is somewhat simpler than that used for a device A, where the one cap has to be able to accommodate various other elements for the reasons next stated.

The end cap form present in the device A structure, of FIGS. 1-2, provides three like similarly located threaded holes 20 therethrough, equi-spaced angularly from each other and radially from the axis of the central bore 19; these three being located in flat end sections 26 of the cap divided from each other by three 120° spaced integral partitions 27 running out from a central integral tubular portion 29 sufficiently large to be threaded and to provide the bore 19, since the core pipe P here is relatively small for only test air flow. The partitions to some degree protect the elements used in the respective apertures, as well as conferring strength. For connection of draw cable parts D, D or the link cable part L between plugs A (see FIG. 7) eye bolts 31 mediately through adapter bushings 31a occupy one eccentric aperture 20 of each cap; and any unused eccentric hole 20 is closed by a threaded plug 25 as in FIG. 2.

Figure 7:
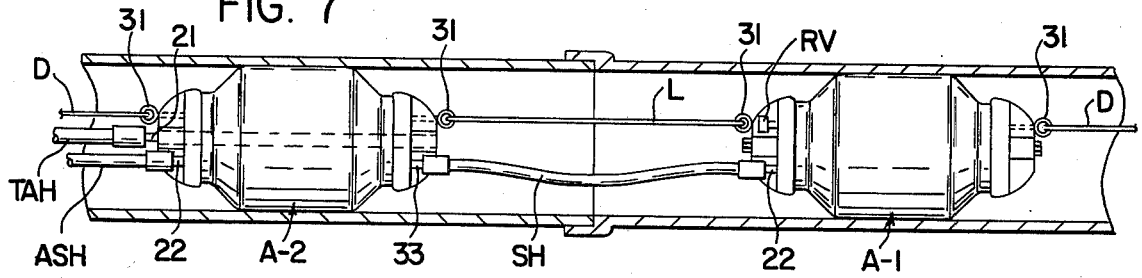
FIG. 7 is a quasi-schematic representation of a dual air test plug arrangement in use.

The additional elements furnished in FIG. 2 adapt the device for use in the second plug position A-2 of FIG. 7, with the right end cap bore 19 being left open to put the conduit interval (between plug A-2 and the lead plug A-1) in communication with a test air supply and/or observing system through test air hose TAH on the fitting 21. The inflating air, charged into the mandrel of A-2 through inflating air supply hose ASH connected to fitting 22, can also pass to plug A-1 through a further connecting fitting 33 in another of the eccentric threaded holes and the short somewhat slack hose SH, providing a pneumatic connection from the trailing plug A-2 to the lead plug A-1. Preferably to the schematic FIG. 7, hose SH actually is supported by or harnessed with the short link cable length L connecting the plugs. The third eccentric aperture of the right cap in FIG. 1-2 is simply closed by a pipe plug, or it may be used for a relief valve to be described, which may be connected to and supported by hose SH or plug A-1. For the lead plug A-1 in FIG. 7, essentially the same structure as that of FIG. 2 is used; but in the right end cap the central bore 19 and two of the eccentric apertures are closed by pipe plugs; while the left end cap preferably has the central bore 19 similarly plugged, since only one connecting fitting, as 22, is required for connecting hose SH, and the third eccentric aperture is a preferred location for said relief valve RV and shown in FIG. 7.

With the fittings and pipe plug arrangement shown and described for A-1, the device A can be used as a simple expandible plug as indeed is its practically sole function in the segmental void test configuration of FIG. 7; with those described for A-2, excepting with replacement of fitting 33 at the right by a closing plug, a simple single air test plug arrangement is available.

Previously in discussion of the locations afforded for attachment of various smaller elements, it was mentioned that a relief valve could be accommodated, at a position such as that at the relief valve position RV in FIG. 7. With such a valve having a release setting at the pressure, say 35 psi, desirable or needed for proper plug inflation, and the usual inflation air supply hose and test air hose connected as usual to the trailing plug, the follow action can be attained.

When an incremental plug advance is completed, the inflation air is fed as usual through hose ASH, to the mandrel interior of A-2 and therefore to the interior of A-1 through the connector hose SH, thus initiating the inflation of both plugs, substantially simultaneously unless for some reason there is an unusual pressure drop across hose SH. When the desired 35 psi is attained in the inflated plugs, relief valve RV opens discharging further air, as delivered, to the inter-plug test interval space, which immediately brings up the pressure to a stable point; this pressure then feeding back through the test air hose TAH to the observed test air guage, under the considerably higher pressure than usually applied in test air lines, so that stabilization is quickly reached, for pressure observation in a few seconds, when the inflation air supply is cut off. The time saving as well as certainty of inflation are decided advantages thus easily obtained.

It may be noted that the presence in a cap of three eccentric apertures 20 has further utility, since from time to time the location of the eye bolts 31 may be changed systematically to distribute wear on a given unit. The multiplicity of apertures is easily provided in casting the caps from an aluminum alloy in a close approach to the desired form, with rapid low cost machining of the bevels and tapping of as-cast holes.

Thus it is seen that the basic structure of the plug device, centering about the inflatable component N, and the similar recessed and beveled inner end faces of the caps, with similar mode of securement, contributes obviously to low cost operations for a manufacturer with but a single part N for distinct plug assemblies, (that is, in a given size plug device) and a respective single casting or part for each of the end cap types. But also this design offers great convenience to a user since by changing cap types and core pipe, either a sewer plug or air test plug is available; and indeed in any of three variants useful in the latter. The conversion is simple, and so also repairs; and, moreover, the parts of a plug device, in which the inflatable sleeve element is damaged, can be simply assembled to a spare inflatable component.

FIGS. 5 and 6 represent forms of end caps useable for a single air test plug device either quite small (FIG. 5) or quite large (FIG. 6) with of course correspondingly sized inflatable components N.

Caps of the form shown in FIG. 5 again are secured by a core pipe as previously discussed, the centrally located threaded part for which is part of an S-shaped test air passage 39. This passage turns laterally and then back parallel to the axis, to an eccentric outer end position similar to but (for accomodation of fittings) well spaced from a straight through aperture 38.

In FIG. 6 the end cap form has six rather than three equispaced holes separated by integral radial partitions 49. One alternating set of three holes has the respective threaded ends of three tie rods 45 extending therethrough, and bearing respective washers 46 (which may have sealing function) and clamping nuts. The other three holes are used for a cable attaching eye bolt 31, for inflating air hose and test air hose connecting fittings 22 and 21, unused holes for any cap again being plugged. Further, where to secure the assembly in an air test plug, tie rods are thus used rather than a core pipe, the air passage function of the latter must be supplied by an internal hose or tubing 41, overlength for ease of installation and connected by appropriate couplings between the eccentric aperture furnished with hose connection fitting 21 on one cap, and a free open aperture of the other cap. However, with appropriate hub surfaces or other formations provided on the caps for applying high torque in the assembly, it is preferable by far to use core pipes as the cap securing means, even in large plugs such as would be used in lines as large as 27 inches.

What is claimed is:

1. A fluid-inflatable plug for interiorly cylindrical conduits comprising:
    an inflatable component constituted of
        a cylindrically tubular mandrel and
        an elastomeric sleeve about the mandrel having its end regions circumferentially bonded to and thereby sealed to the mandrel, and a substantial part of its length circumferentially unbonded and free of the mandrel surface;
        the tubular wall of said mandrel having a port therethrough to a space defined between the mandrel and the free part of the sleeve;
        the respective endmost portions of said sleeve being circumferentially male-beveled;
    a pair of end caps providing respective mandrel closures on the ends of said component and, therewith defining a closed hollow space,
        each said cap having its inner face circularly recessed and the outer periphery of the recess thereof circumferentially female-beveled generally complementarily to the bevel of a sleeve end, to provide end clearance between the mandrel end and the cap with the respective male and female bevels engaged;
    means securing said caps on said component and by longitudinally directed force holding the male and female bevels in fluid-tight relation,
        said means extending longitudinally within the hollow interior of the mandrel; and
    means on one of said end caps for admitting pressurized fluid to the interior of the mandrel end thence through the said port to the first said space for inflating said component;
    the means securing said caps comprising a core pipe threaded at its ends and, through each end cap, a respective passage terminating at the cap inner face in a central aperture threaded to receive an end of the core pipe,
        whereby the caps by screwing onto the pipe ends are secured to each other and in sealed relation on the inflatable component, and
        a fluid passage is available through said plug independently of the path for pressurizing fluid inflating said component.

2. A plug as described in claim 1, wherein
said end caps are identical and
    each has therethrough an eccentrically located threaded straight aperture;
    said eccentrially located aperture of one cap being closed by a threaded plug and that of the other cap receiving a fitting adapted for connection of a pressurized fluid supply hose for inflating said component,
said core pipe being sized for opted passage of water in a conduit flushing flow;
thereby affording a sewer plug type configuration.

3. A plug as described in claim 1, wherein
said end caps are identical and
    each has therethrough a substantially straight, eccentrically located threaded aperture, and
    an aperture having an eccentric outer end threaded for an air hose connecting fitting and a concentric inner end threaded to receive the end of a core pipe therein.

4. A plug as described in claim 1, wherein
said end caps are identical and
    each has therethrough a central straight aperture threaded on its inner end to provide the said threaded aperture for receiving a core pipe end, and threaded on its outer end optionally to receive an air hose connecting fitting or a pipe plug,
    a plurality of three further straight apertures eccentrically located,
    one having a cable-connecting eye bolt threaded therein, and the other two optionally to receive a respective pipe plug in each or a pipe plug in one with an air hose connecting fitting in the other,
thereby affording an air test plug configuration, with an option by selection of said pipe plugs and fittings for a single air test plug or either of the two forms of plug required for a dual air test plug arrangement.

5. A plug as described in claim 4, wherein
one of said caps, intended to face a conduit interval to be tested, is provided with a pressure relief valve connected at one of the said three straight apertures to the hollow space of the mandrel, and set to open and release air at a pressure desired to be used for plug inflation,
whereby through supply of inflating air to the plug, upon the pressurizing of the mandrel to said pressure and the relief valve opening, air is released into a conduit space to be tested.

* * * * *